(12) United States Patent
Finkelstein et al.

(10) Patent No.: US 12,055,637 B2
(45) Date of Patent: Aug. 6, 2024

(54) STROBING FLASH LIDAR WITH FULL FRAME UTILIZATION

(71) Applicant: Sense Photonics, Inc., Durham, NC (US)

(72) Inventors: Hod Finkelstein, Berkeley, CA (US); Robert Henderson, Edinburgh (GB); Tarek Al Abbas, Edinburgh (GB); David Storrar, Falkirk (GB)

(73) Assignee: Sense Photonics, Inc., Durham, NC (US)

( * ) Notice: Subject to any disclaimer, the term of this patent is extended or adjusted under 35 U.S.C. 154(b) by 966 days.

(21) Appl. No.: 17/071,589

(22) Filed: Oct. 15, 2020

(65) Prior Publication Data

US 2021/0109224 A1  Apr. 15, 2021

Related U.S. Application Data

(60) Provisional application No. 62/915,308, filed on Oct. 15, 2019.

(51) Int. Cl.
*G01C 3/08* (2006.01)
*G01S 7/484* (2006.01)
*G01S 17/894* (2020.01)
*G06F 3/06* (2006.01)

(52) U.S. Cl.
CPC ............ *G01S 17/894* (2020.01); *G01S 7/484* (2013.01); *G06F 3/0622* (2013.01); *G06F 3/0659* (2013.01); *G06F 3/0673* (2013.01)

(58) Field of Classification Search
CPC .... G01S 17/894; G06F 3/0622; G06F 3/0659; G06F 3/0673
See application file for complete search history.

(56) References Cited

U.S. PATENT DOCUMENTS

| | | | |
|---|---|---|---|
| 9,153,609 B2 | 10/2015 | Blanquart | |
| 2018/0164415 A1 | 6/2018 | Buckley et al. | |
| 2018/0209846 A1* | 7/2018 | Mandai | G01S 17/894 |
| 2018/0301872 A1 | 10/2018 | Burroughs et al. | |
| 2019/0179021 A1 | 6/2019 | Wang et al. | |
| 2019/0179022 A1 | 6/2019 | Agarwal | |

(Continued)

FOREIGN PATENT DOCUMENTS

KR           101978608         5/2019

OTHER PUBLICATIONS

U.S. Appl. No. 16/778,476, filed Jan. 31, 2020.
(Continued)

*Primary Examiner* — Mark Hellner
(74) *Attorney, Agent, or Firm* — Kilpatrick Townsend & Stockton LLP

(57) ABSTRACT

A Light Detection and Ranging (lidar) system, includes an emitter configured to emit a plurality of optical signals, a detector configured to be activated to detect one of the optical signals in light that is incident on the detector and to provide count data corresponding to the one of the optical signals that were detected, a plurality of storage memory locations configured to store the count data therein, and a control circuit configured to change a location at which the count data is stored from a first storage memory location to a second storage memory location based on an elapsed time duration from an emission of the one of the optical signals.

20 Claims, 9 Drawing Sheets

(56) References Cited

U.S. PATENT DOCUMENTS

| | | |
|---|---|---|
| 2019/0257950 A1 | 8/2019 | Patanwala et al. |
| 2019/0310368 A1 | 10/2019 | Lachapelle |
| 2020/0200910 A1* | 6/2020 | Pan .................. G01S 7/484 |
| 2021/0096263 A1* | 4/2021 | Subasingha .......... G01S 17/894 |

OTHER PUBLICATIONS

U.S. Appl. No. 16/273,783, filed Feb. 12, 2019.
Extended European Search Report Corresponding to European Application No. 20876133.8 (8 pages) (Aug. 18, 2023).
PCT Notification of Transmittal of the International Search Report and the Written Opinion of the International Searching Authority, or the Declaration, mailed Feb. 10, 2021, for corresponding PCT International Application No. PCT/US2020/055739.

* cited by examiner

STROBING FLASH LIDAR WITH FULL FRAME UTILIZATION

CLAIM OF PRIORITY

This application claims the benefit of priority from U.S. Provisional Patent Application No. 62/915,308, filed Oct. 15, 2019, in the United States Patent and Trademark Office, the disclosure of which is incorporated by reference herein in its entirety.

FIELD

The present disclosure is directed to Light Detection and Ranging (LIDAR or lidar) systems, and more particularly, to methods and devices to detect peaks in histograms of pixels of time-of-flight lidar systems.

BACKGROUND

Time of flight (ToF) based imaging is used in a number of applications including range finding, depth profiling, and 3D imaging (e.g., lidar). Direct time of flight measurement includes directly measuring the length of time between emitting radiation and sensing the radiation after reflection from an object or other target. From this, the distance to the target can be determined. Indirect time of flight measurement includes determining the distance to the target by phase modulating the amplitude of the signals emitted by emitter element(s) of the lidar system and measuring phases (e.g., with respect to delay or shift) of the echo signals received at detector element(s) of the lidar system. These phases may be measured with a series of separate measurements or samples. In specific applications, the sensing of the reflected radiation in either direct or indirect time of flight systems may be performed using an array of single-photon detectors, such as a Single Photon Avalanche Diode (SPAD) array. SPAD arrays may be used as solid-state detectors in imaging applications where high sensitivity and timing resolution are useful.

A SPAD is based on a p-n junction device biased beyond its breakdown region, for example, by or in response to a strobe signal having a desired pulse width. The high reverse bias voltage generates a sufficient magnitude of electric field such that a single charge carrier introduced into the depletion layer of the device can cause a self-sustaining avalanche via impact ionization. The avalanche is quenched by a quench circuit, either actively or passively, to allow the device to be "reset" to detect further photons. The initiating charge carrier can be photo-electrically generated by means of a single incident photon striking the high field region. It is this feature which gives rise to the name "Single Photon Avalanche Diode." This single photon detection mode of operation is often referred to as "Geiger Mode."

Power consumption in lidar systems can be particularly problematic in some applications, e.g., unmanned aerial vehicle (UAV), automotive, and industrial robotics. For example, in automotive applications, the increased emission power requirements must be met by the car's power supply, which may add a considerable load for car manufacturers. Also, heat generated from the higher emission power may alter the optical performance of the light emitting array and/or may negatively affect reliability.

SUMMARY

Some embodiments described herein provide methods, systems, and devices including electronic circuits to address the above and other problems by providing a lidar system including one or more emitter units (including one or more semiconductor lasers, such as surface- or edge-emitting laser diodes; generally referred to herein as emitters), one or more light detector pixels (including one or more semiconductor photodetectors, such as photodiodes, including avalanche photodiodes and single-photon avalanche detectors; generally referred to herein as detectors), and a control circuit that is configured to selectively operate subsets of the emitter units and/or detector pixels (including respective emitters and/or detectors thereof) to provide a 3D time of flight (ToF) flash lidar system. The detectors pixels may be active for a majority (or all) of a time between pulses of the emitter units and a location at which count data from the detector pixels is stored may be changed based on an elapsed time from one of the pulses of the emitter units.

Pursuant to some embodiments of the present invention, a Light Detection and Ranging (lidar) system, includes an emitter configured to emit a plurality of optical signals, a detector configured to be activated to detect one of the optical signals in light that is incident on the detector and to provide count data corresponding to the one of the optical signals that were detected, a plurality of storage memory locations configured to store the count data therein, and a control circuit configured to change a location at which the count data is stored from a first storage memory location to a second storage memory location based on an elapsed time duration from an emission of one of the optical signals.

In some embodiments, the detector comprises a plurality of detectors, and the first storage memory location and the second storage memory location are shared between the plurality of detectors.

In some embodiments, the control circuit is further configured to perform a precharge, read, modify, write (PRMW) operation to store the count data in the second storage memory location.

In some embodiments, the plurality of optical signals comprise a first optical signal and a second optical signal, subsequent to the first optical signal, with a pulse cycle duration therebetween.

In some embodiments, the control circuit is further configured to activate the detector for a duration that is longer than half of the pulse cycle duration between the first optical signal and the second optical signal.

In some embodiments, the control circuit is further configured to selectively operate the emitter at a first power level or a second power level, less than the first power level.

In some embodiments, the control circuit is further configured to operate the emitter at the first power level, and the control circuit is further configured to deactivate the detector during a first portion of the pulse cycle duration and to activate the detector during a second portion of the pulse cycle duration, after the first portion.

In some embodiments, the control circuit is further configured to operate the emitter at the second power level, and the control circuit is further configured to activate the detector during a first portion of the pulse cycle duration and to deactivate the detector during a second portion of the pulse cycle duration, after the first portion.

In some embodiments, the control circuit is further configured to operate the emitter at the first power level to emit the first optical signal and to operate the emitter at the second power level to emit the second optical signal.

In some embodiments, the system further includes a detector pixel comprising the detector, the plurality of storage memory locations, and the control circuit.

In some embodiments, the detector, the plurality of storage memory locations, and/or the control circuit of the detector pixel are on a plurality of substrates.

In some embodiments, the detector pixel comprises a through-silicon-via, an interposer, and/or a metal connection between respective ones of the plurality of substrates.

In some embodiments, a first substrate of the plurality of substrates comprises the plurality of storage memory locations and a second substrate of the plurality of substrates comprises the detector.

In some embodiments, the second substrate comprises the control circuit.

In some embodiments, a third substrate of the plurality of substrates comprises the control circuit.

In some embodiments, the lidar system further includes a signal processing circuit, the detector comprises a plurality of detectors, each coupled to the signal processing circuit, and the control circuit is further configured to activate one or more of the plurality of detectors responsive to the one of the optical signals so as to avoid a saturation of the signal processing circuit.

In some embodiments, the control circuit is further configured to detect an intensity of background light in the light that is incident on at least one of the plurality of detectors and control the activation of the one or more of the plurality of detectors responsive thereto.

In some embodiments, the first storage memory location comprises a first plurality of histogram bins, each configured to store a first plurality of bits associated with the count data, and the second storage memory location comprises a second plurality of second histogram bins, each configured to store a second plurality of bits associated with the count data.

Pursuant to some embodiments of the present invention, a control circuit of a Light Detection and Ranging (lidar) system is configured to perform operations including controlling an emitter to emit a first optical signal and a second optical signal subsequent to the first optical signal, with a pulse cycle duration therebetween, activating a detector to detect one of the first and/or second optical signals in light that is incident on the detector and to provide count data corresponding to the one of the first and/or second optical signals that were detected, wherein the detector is activated for a time duration that is longer than half of the pulse cycle duration between the first optical signal and the second optical signal, and controlling access to a shared memory location to change a location at which the count data is stored from a first storage memory location to a second storage memory location based on an elapsed time duration from an emission of the first optical signal In some embodiments, the first storage memory location comprises a first plurality of histogram bins, each configured to store a first plurality of bits associated with the count data, and the second storage memory location comprises a second plurality of second histogram bins, each configured to store a second plurality of bits associated with the count data.

In some embodiments, the detector comprises a plurality of detectors, the first storage memory location and the second storage memory location are shared between the plurality of detectors, and the control circuit is further configured to perform a precharge, read, modify, write (PRMW) operation to store the count data in the second storage memory location.

In some embodiments, the control circuit is further configured to activate the detector for a duration that is longer than half of the pulse cycle duration between the first optical signal and the second optical signal.

In some embodiments, the control circuit is further configured to deactivate the detector during a first portion of the pulse cycle duration and to activate the detector during a second portion of the pulse cycle duration, after the first portion.

In some embodiments, the control circuit is further configured to activate the detector during a first portion of the pulse cycle duration and to deactivate the detector during a second portion of the pulse cycle duration, after the first portion.

In some embodiments, the control circuit is further configured to activate the detector during a third portion of the pulse cycle duration after the second portion.

In some embodiments, the control circuit is further configured to operate the emitter at a first power level to emit the first optical signal and to operate the emitter at a second power level, different from the first power level, to emit the second optical signal.

In some embodiments, the control circuit is further configured to selectively activate the detector responsive to the first optical signal and/or the second optical signal so as to avoid a saturation of a signal processing operation performed with respect to the detector.

In some embodiments, the control circuit is further configured to detect an intensity of background light in the light that is incident on the detector and control the activation of the detector responsive thereto.

In some embodiments, the detector is configured to generate a first output signal in response to the first optical signal and a second output signal in response to the second optical signal, and the control circuit is further configured to generate range data of a target object based on the first output signal, the second output signal, or a combination of the first output signal and the second output signal.

Pursuant to some embodiments of the present invention, a method of operating a control circuit a Light Detection and Ranging (lidar) system includes controlling an emitter to emit a first optical signal and a second optical signal subsequent to the first optical signal, activating a detector to detect one of the first and/or second optical signals in light that is incident on the detector and to provide count data corresponding to the one of the first and/or second optical signals that were detected, wherein the detector is activated for a time duration that is longer than half of a pulse cycle duration between the first optical signal and the second optical signal, and controlling access to a shared memory location to change a location at which the count data is stored from a first storage memory location to a second storage memory location based on an elapsed time duration from an emission of the first optical signal In some embodiments, the detector comprises a plurality of detectors, the first storage memory location and the second storage memory location are shared between the plurality of detectors, and the method further comprises performing a precharge, read, modify, write (PRMW) operation to store the count data in the second storage memory location.

In some embodiments, the control circuit is further configured to activate the detector for a duration that is longer than half of the pulse cycle duration between the first optical signal and the second optical signal.

In some embodiments, the method further includes deactivating the detector during a first portion of the pulse cycle duration and to activate the detector during a second portion of the pulse cycle duration, after the first portion.

In some embodiments, the method further includes activating the detector during a first portion of the pulse cycle duration and to deactivate the detector during a second portion of the pulse cycle duration, after the first portion.

In some embodiments, the method further includes activating the detector during a third portion of the pulse cycle duration after the second portion.

In some embodiments, the method further includes operating the emitter at a first power level to emit the first optical signal and to operate the emitter at a second power level, different from the first power level, to emit the second optical signal.

In some embodiments, the method further includes selectively activating the detector responsive to the first optical signal and/or the second optical signal so as to avoid a saturation of a signal processing operation performed with respect to the detect.

In some embodiments, the method further includes detecting an intensity of background light in the light that is incident on the detector and control the activation of the detector responsive thereto.

In some embodiments, the detector is configured to generate a first output signal in response to the first optical signal and a second output signal in response to the second optical signal, and the method further includes generating range data of a target object based on the first output signal, the second output signal, or a combination of the first output signal and the second output signal.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION

In the following detailed description, numerous specific details are set forth to provide a thorough understanding of embodiments of the present disclosure. However, it will be understood by those skilled in the art that the present disclosure may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

A lidar system may include an array of emitters and an array of detectors, or a system having a single emitter and an array of detectors, or a system having an array of emitters and a single detector. As described herein, one or more emitters may define an emitter unit, and one or more detectors may define a detector pixel. A flash lidar system may acquire images by emitting light from an array of emitters, or a subset of the array, for short durations (pulses) over a field of view (FoV) or scene, and detecting the echo signals reflected from one or more targets in the FoV at one or more detectors. A non-flash or scanning lidar system may generate image frames by raster scanning light emission (continuously) over a field of view or scene, for example, using a point scan or line scan to emit the necessary power per point and sequentially scan to reconstruct the full FoV.

Figure 1:
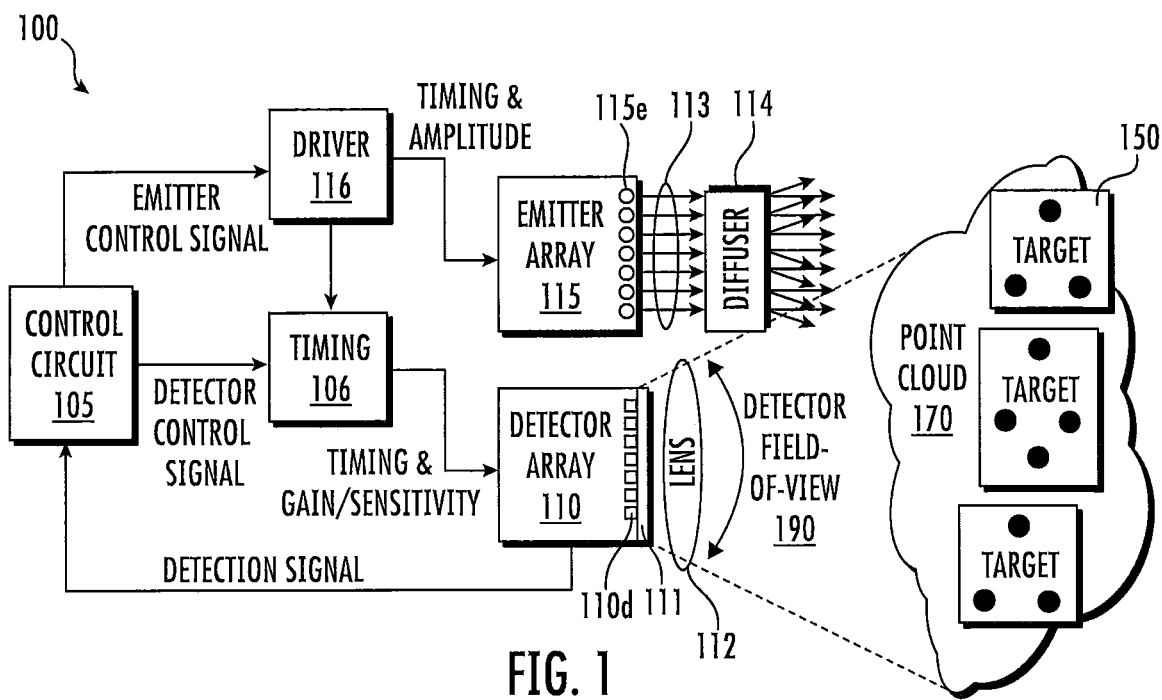
FIG. 1 is a block diagram illustrating an example lidar system or circuit in accordance with some embodiments of the present disclosure.

An example of a lidar system or circuit 100 in accordance with embodiments of the present disclosure is shown in FIG. 1. The lidar system 100 includes a control circuit 105, a timing circuit 106, an emitter array 115 including a plurality of emitters 115e, and a detector array 110 including a plurality of detectors 110d. The detectors 110d include time-of-flight sensors (for example, an array of single-photon detectors, such as SPADs). One or more of the emitter elements 115e of the emitter array 115 may define emitter units that respectively emit a radiation pulse or continuous wave signal (for example, through a diffuser or optical filter 114) at a time and frequency controlled by a timing generator or driver circuit 116. In particular embodiments, the emitters 115e may be pulsed light sources, such as LEDs or lasers (such as vertical cavity surface emitting lasers (VCSELs)). Radiation is reflected back from a target 150, and is sensed by detector pixels defined by one or more detector elements 110d of the detector array 110. The control circuit 105 implements a pixel processor that measures and/or calculates the time of flight of the illumination pulse over the journey from emitter array 115 to target 150 and back to the detectors 110d of the detector array 110, using direct or indirect ToF measurement techniques.

In some embodiments, an emitter module or circuit 115 may include an array of emitter elements 115e (e.g., VCSELs), a corresponding array of optical elements 113,114 coupled to one or more of the emitter elements (e.g., lens(es) 113 (such as microlenses) and/or diffusers 114), and/or driver electronics 116. The optical elements 113, 114 may be optional, and can be configured to provide a sufficiently low beam divergence of the light output from the emitter elements 115e so as to ensure that fields of illumination of either individual or groups of emitter elements 115e do not significantly overlap, and yet provide a sufficiently large beam divergence of the light output from the emitter elements 115e to provide eye safety to observers.

The driver electronics 116 may each correspond to one or more emitter elements, and may each be operated responsive to timing control signals with reference to a master clock and/or power control signals that control the peak power of the light output by the emitter elements 115e. In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors configured to control the modulation frequency, timing and amplitude of the optical emission signals that are output from the emitters 115e.

The emission of optical signals from multiple emitters 115e provides a single image frame for the flash LIDAR system 100. The maximum optical power output of the emitters 115e may be selected to generate a signal-to-noise ratio of the echo signal from the farthest, least reflective target at the brightest background illumination conditions that can be detected in accordance with embodiments described herein. An optional filter to control the emitted wavelengths of light and diffuser 114 to increase a field of illumination of the emitter array 115 are illustrated by way of example.

Light emission output from one or more of the emitters 115e impinges on and is reflected by one or more targets 150, and the reflected light is detected as an optical signal (also referred to herein as a return signal, echo signal, or echo) by one or more of the detectors 110d (e.g., via receiver optics 112), converted into an electrical signal representation (referred to herein as a detection signal), and processed (e.g., based on time of flight) to define a 3-D point cloud representation 170 of the field of view 190. Operations of lidar systems in accordance with embodiments of the present disclosure as described herein may be performed by one or more processors or controllers, such as the control circuit 105 of FIG. 1.

In some embodiments, a receiver/detector module or circuit 110 includes an array of detector pixels (with each detector pixel including one or more detectors 110d, e.g., SPADs), receiver optics 112 (e.g., one or more lenses to collect light over the FoV 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest FoV that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of 'signal' light (i.e., light of wavelengths corresponding to those of the optical signals output from the emitters) but substantially reject or prevent passage of non-signal light (i.e., light of wavelengths different than the optical signals output from the emitters).

The detectors 110d of the detector array 110 are connected to the timing circuit 106. The timing circuit 106 may be phase-locked to the driver circuitry 116 of the emitter array 115. The sensitivity of each of the detectors 110d or of groups of detectors may be controlled. For example, when the detector elements include reverse-biased photodiodes, avalanche photodiodes (APD), PIN diodes, and/or Geiger-mode Avalanche Diodes (SPADs), the reverse bias may be adjusted, whereby, the higher the overbias, the higher the sensitivity.

In some embodiments, a control circuit 105, such as a microcontroller or microprocessor, provides different emitter control signals to the driver circuitry 116 of different emitters 115e and/or provides different signals (e.g., strobe signals) to the timing circuitry 106 of different detectors 110d to enable/disable the different detectors 110d so as to detect the echo signal from the target 150.

Figure 2:
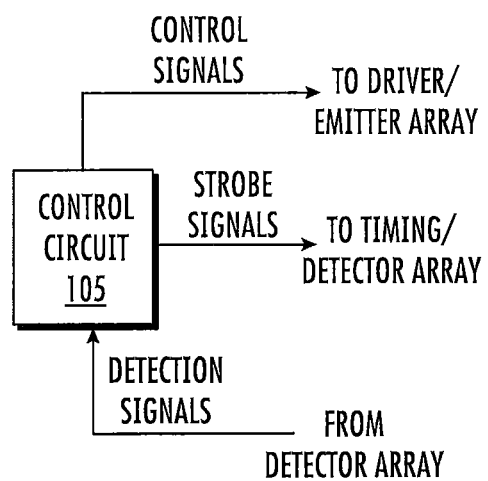
FIG. 2 is a block diagram illustrating an example control system or circuit in accordance with some embodiments of the present disclosure.

An example of a control circuit 105 that generates emitter and/or detector control signals is shown in FIG. 2. The control circuit of FIG. 2 may represent one or more control circuits, for example, an emitter control circuit that is configured to provide the emitter control signals to the driver circuitry 116 of the emitter array 115 and/or a detector control circuit that is configured to provide the strobe signals to the timing circuitry 106 of the detector array 110 as described herein. Also, the control circuit 105 may include a sequencer circuit that is configured to coordinate operation of the emitters 115e and detectors 110d. More generally, the control circuit 105 may include one or more circuits that are configured to generate the respective detector signals that control the timing and/or durations of activation of the detectors 110d, and/or to generate respective emitter control signals that control the output of optical signals from the emitters 115e.

Strobing as used herein may refer to the generation of detector control signals (also referred to herein as strobe signals or 'strobes') to control the timing and/or duration of activation (also referred to herein as strobe windows) of one or more detectors 110d of the lidar system 100.

In some lidar implementations, different imaging distance ranges may be achieved by using different emitters 115e. For example, an emitter 115e configured to illuminate targets that are 150 up to a 200 meter (m) distance range may be operated to emit four times the power per solid angle as an emitter 115e configured to image up to a 100 m distance range. In some embodiments, a same emitter 115e may be configured to utilize different power levels depending on a distance being imaged. For example, if the lidar system 100 is configured to illuminate targets 150 at, for example, a distance of 200 meters from the emitter array 115, the emitter 115e may be driven at a first power level. If the lidar system 100 switches or is otherwise configured (e.g., dynamically) to illuminate targets 150 at, for example, a distance of 100 meters from the emitter array 115, the emitter 115e may be driven at a second power level that is less than the first power level. Examples of methods to selectively control the power levels of emitters are discussed, for example, in U.S. patent application Ser. No. 16/778,476, filed Jan. 31, 2020, entitled "STROBE WINDOW DEPENDENT ILLUMINATION FOR FLASH LIDAR," ("the '476 application") the contents of which are incorporated herein by reference.

Some embodiments of the present invention arise from recognition that an average power usage of a lidar system may be improved by maintaining an activation state of a detector element (e.g., detector 110d) over a full emitter cycle and dynamically altering a count storage location of the detector element during the emitter cycle.

A range-strobing flash lidar (e.g., with strobe windows corresponding to respective distance ranges) may use strobing for several reasons. For example, in some embodiments, detector elements may be combined into pixels and selectively activated after the emission of optical signals to detect echo signals from a target during specific strobe windows. The detected echo signals may be used to generate a histogram of detected "counts" of photons incident on the detector from the echo signal. Examples of methods to detect a target distance based on histograms are discussed, for example, in U.S. patent application Ser. No. 16/273,783, filed Feb. 12, 2019, entitled "METHODS AND SYSTEMS FOR HIGH-RESOLUTION LONG-RANGE FLASH LIDAR," the contents of which are incorporated herein by reference.

Figure 3:
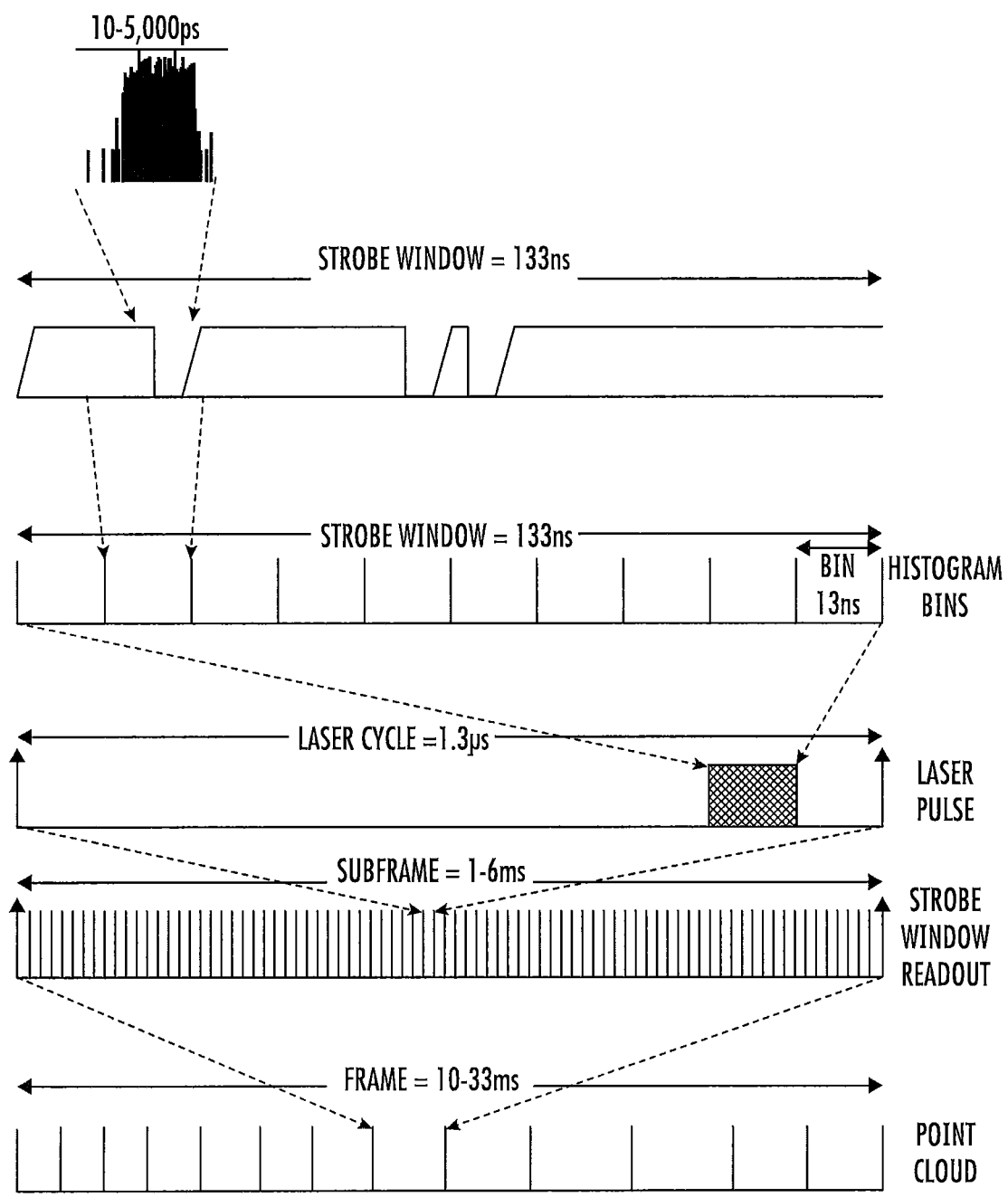
FIG. 3 is a diagram illustrating relationships between image frames, subframes, laser cycles, and time gates as utilized in some lidar systems.

FIG. 3 is a diagram illustrating relationships between image frames, subframes, laser cycles, and time gates (also referred to herein as strobe windows) as utilized in some lidar systems. As shown in FIG. 3, a strobe window having a particular duration may be activated during an example laser cycle having a particular time duration between emitted laser pulses. For example, at an operating frequency of 750 kHz, a laser cycle may be about 1.3 µs. This operating frequency is merely an example, and other potential frequencies/laser cycles may be used. For example, other operating frequencies include 375 kHz (about 2.6 µs) or 1.5 MHz (about 0.6 µs), to name just a few. Different time durations within individual laser cycles may be associated with respective strobe windows. For example, the time duration of the laser cycle may be divided into a plurality of potential strobe window durations, such as, for example, 10 strobe windows of approximately 133 ns each. A first one of these strobe windows may be active during a first one of the laser cycles, while a second one of the strobe windows may be active during a second one of the laser cycles. The strobe windows can be mutually exclusive or overlapping in time over the respective laser cycles, and can be ordered monotonically or not monotonically. Data regarding detected photons by the detector during one of the strobe windows may be stored within histogram bins. The histogram bins may be statistically analyzed to detect a peak number of detected photons within the strobe window. An image subframe may include multiple laser pulses with an associated laser cycle, with a strobe window active in each of the laser cycles. For example, there may be about 1000 laser cycles in each subframe. Each subframe may also represent data collected for a respective strobe window. A strobe window readout operation may be performed at the end of each subframe, with multiple subframes (each corresponding to a respective strobe window) making up each image frame (for example, 20 subframes in each frame). The timings shown in FIG. 3 are by way of example only, and other timings may be possible in accordance with embodiments described herein.

Figure 4A:
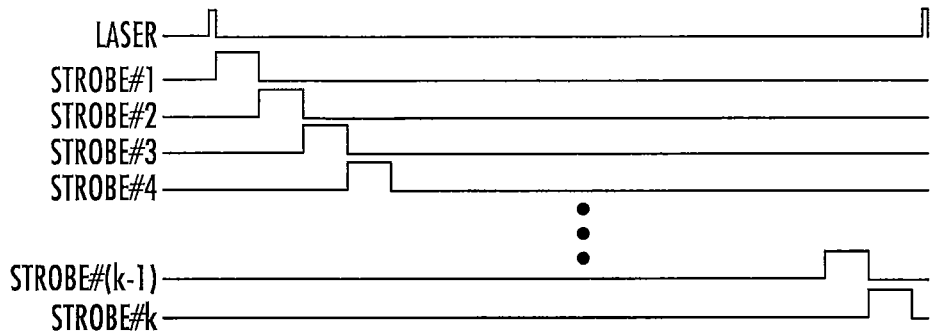
FIG. 4A is a diagram illustrating an example of range strobing such as that utilized in FIG. 3.

FIG. 4A illustrates an example of range strobing such as that utilized in FIG. 3. In particular, FIG. 4A illustrates the timing of a succession of k strobe windows with respect to the laser pulses of the lidar system, with each strobe window 1-k defining a duration of activation for a detector (e.g., a SPAD) at respective delays that differ with respect to the laser pulses, responsive to respective strobing signals Strobe #1-Strobe #k. In some embodiments, the strobe windows 1-k may be identical in duration, as shown in FIG. 4A.

Figure 4B:
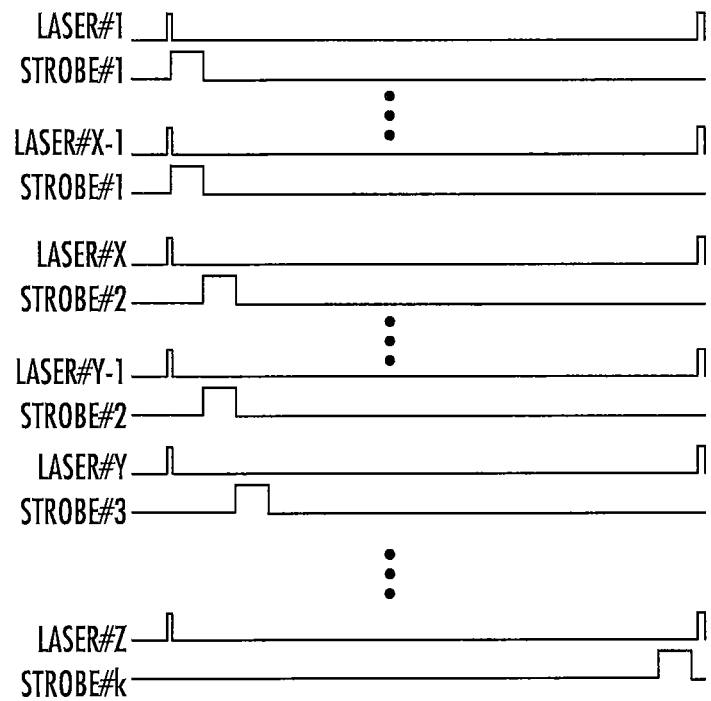
FIG. 4B is a diagram illustrating an example of the timing of the strobe signals of FIG. 4A in relation to their respective laser pulses.

Though FIG. 4A illustrates multiple strobe windows adjacent an individual laser pulse, it will be understood that this is to show the perspective of the delay with respect to a given laser pulse. For detection purposes, some lidar systems activate a particular strobe only once with respect to a particular laser pulse. In other words, a particular detector (e.g., a SPAD) may only be active for a single strobe window (with a corresponding distance sub-range) for a particular laser cycle. Other photons incident on the SPAD during other parts of the laser cycle (e.g., corresponding to other distance sub-ranges) may be ignored. FIG. 4B illustrates an example of the timing of the Strobe #1-Strobe #k of FIG. 4A in relation to their respective laser pulses. For example, FIG. 4B illustrates that a particular strobe window (e.g., a particular time of activation for a detector corresponding to a particular distance range) might be used for multiple laser cycles. For example, a first strobe window (e.g., Strobe #1) may be used for a plurality of laser cycles (e.g., Laser #1-Laser #(X–1)). A second strobe window (e.g., Strobe #2) corresponding to a different distance sub-range, may be used for a second plurality of laser cycles (e.g., Laser #X-Laser #(Y–1)). This progression may continue through subsequent strobe windows, corresponding to different distance sub-ranges, until each of the distance sub-ranges (e.g., k strobe windows) have been sampled, with multiple laser cycles being utilized for each distance sub-range. Though FIGS. 4A and 4B describe the user of lasers as optical emitters, it will be understood that other types of optical signals may also be used without deviating from the scope and spirit of the invention.

A time between the pulses of the optical signals (and/or the corresponding strobe windows) may correspond to a distance range (e.g., a time it takes for a photon to travel from the emitter, to a target at the distance range, and back to the detector), and the respective strobe windows may thus correspond to sub-ranges of the distance range. Possible distance ranges include, but are not limited to, 50 m, 100 m, 150 m, 200 m, or 400 m. For example, to image a distance range of 200 meters (m), ten respective strobe windows may be defined to cover distance sub-ranges of 1 m-20 m, 20 m-40 m, 40 m-60 m, . . . , and 180 m-200 m.

In some embodiments, the number of laser cycles allocated per time window (e.g., per strobe window readout for each subframe, as shown in FIG. 3, where each subframe indicates data for a distance sub-range associated with a respective strobe window) may be adjusted or varied. In some embodiments, the number of laser cycles in each frame or subframe covering a specific distance sub-range may be constant, regardless or independent of the strobe window width or distance range. That is, by way of example, for detection at 10 frames per second using a 750 kHz laser, each frame may correspond to 75,000 laser cycles covering distance sub-ranges of 1 m-20 m, 20 m-40 m, 40 m-60 m, . . . , and 180 m-200 m. In some embodiments, the number of laser cycles corresponding to each frame or subframe is different for different distance sub-ranges. For example, subframes for farther strobe windows (with a longer delay from the laser pulse firing, e.g., covering farther distances of 180-200 meters) may be allocated or otherwise correspond to a greater portion (or a lesser portion) of the number of laser cycles than subframes for closer strobe windows (with a shorter delay from the laser pulse firing, e.g., covering closer distances of 0-40 meters), rather than allocating the number of laser cycles equally per strobe window or subframe. That is, in some embodiments, the number of laser cycles for a distant strobe window may be larger than the number of laser cycles for a closer strobe window, or vice versa.

In some embodiments, a power with which a particular emitter is driven may be adjusted or varied according to the distance (and corresponding strobe window) which it is intended to detect. Examples of such methods are discussed in the '476 application, incorporated by reference herein. For example, bursts of emitter laser pulses may be emitted for each strobe window with a power sufficient to detect the dimmest target at each strobe range. This may scale the required power by $1/R^2$, where R is the distance sub-range associated with the strobe window. For example, subframes for farther distance ranges (e.g., covering farther distances of 180-200 meters) may be associated with emitter pulses in which the emitter is driven with a higher power than that used during laser cycles corresponding to subframes for closer distance ranges (e.g., covering closer distances of 0-40 meters).

As discussed herein, the count of photons detected a subframe may be arranged in a histogram to determine the true distance to the imaged target. In-pixel histogramming may require n×m memory bits per pixel, where n refers to the number of bins and m refers to the number of bits per bin. The number of bins may refer to the ratio of the total range in a measurement divided by the histogram's nominal temporal resolution (while improved temporal resolution can be interpolated, the relation still holds that narrower bins correlate with finer temporal resolution). The number of bits may determine the dynamic range of signals which can be collected. To keep the pixel size relatively small, the number of memory bits may be minimized or reduced. Since the dynamic range may be given by the target reflectivity dynamic range as well as by the ambient irradiance, limiting the total range of distances can be used to reduce the number of bits per pixel.

In addition, strobing may be used to reduce system power. As noted above, bursts of emitter laser pulses are emitted for each strobe window with a power sufficient to detect the dimmest target at each strobe range R, thus scaling the required power by $1/R^2$. A detector or sensor of the lidar system, such as a single-photon avalanche detector (SPAD), may be charged a time t after the laser pulse emission, which corresponds to the beginning of the strobed range and for a duration dt which corresponds to the depth of the strobe window (e.g., the distance range corresponding to the duration of activation of the detector).

For example, if the power required to measure a dim target at 200 m is 1 W, and 10 equal-duration strobe windows are used, the power required for strobe windows 1, 2, . . . 10 may be $0.1^2$ W, $0.2^2$ W, . . . 1 W, respectively, with an average power of 0.385 W. One deficiency of this scheme is that for a given frame with k strobed subframes, (k−1)/k of the signal is not collected. For example, and referring to FIGS. 4A and 4B, if k is equal to 10, such that there are k distance sub-ranges that are strobed, then during a given laser pulse, the detector (e.g., the SPAD) may only be active during $1/k^{th}$ of the time between laser pulse and inactive during other portions (e.g., not detecting photons). As such, $9/10^{th}$ of the signal during the duration between laser pulses is not collected.

However, it may be desirable to further reduce or minimize lidar average power consumption, which may typically be dominated by the laser power.

Figure 5:
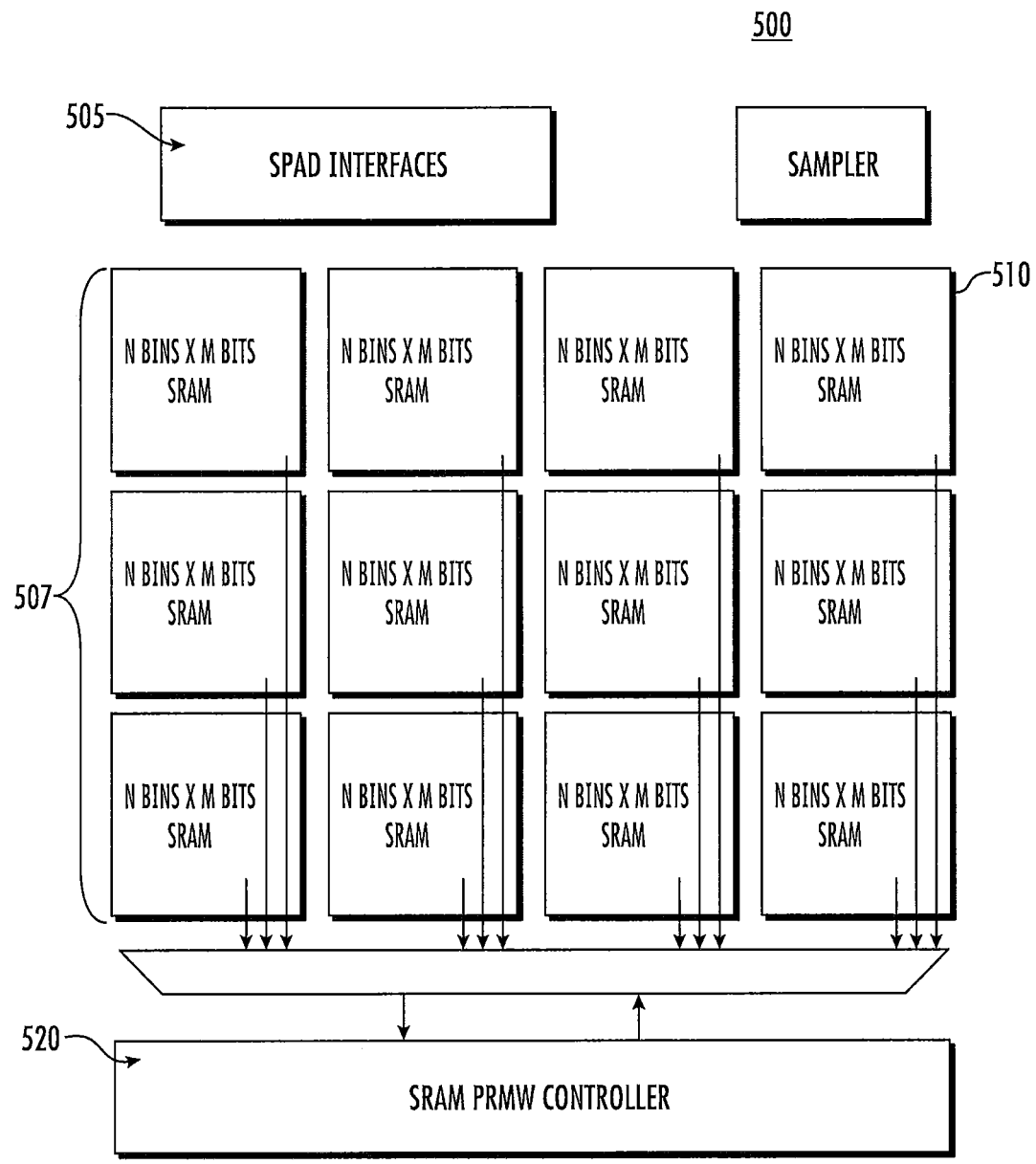
FIG. 5 is a block diagram illustrating an example of a detector pixel with multiple shared memory sub-arrays and a Precharge, Read, Modify, Write controller in accordance with some embodiments of the present disclosure.
Figure 6A:
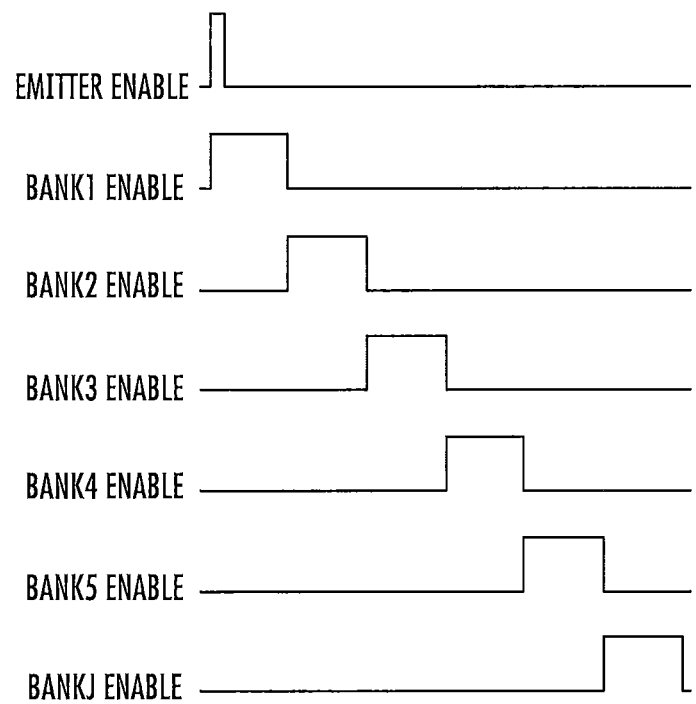
FIGS. 6A and 6B illustrate an example of a timing diagram for the detector pixel of FIG. 5.
Figure 6B:
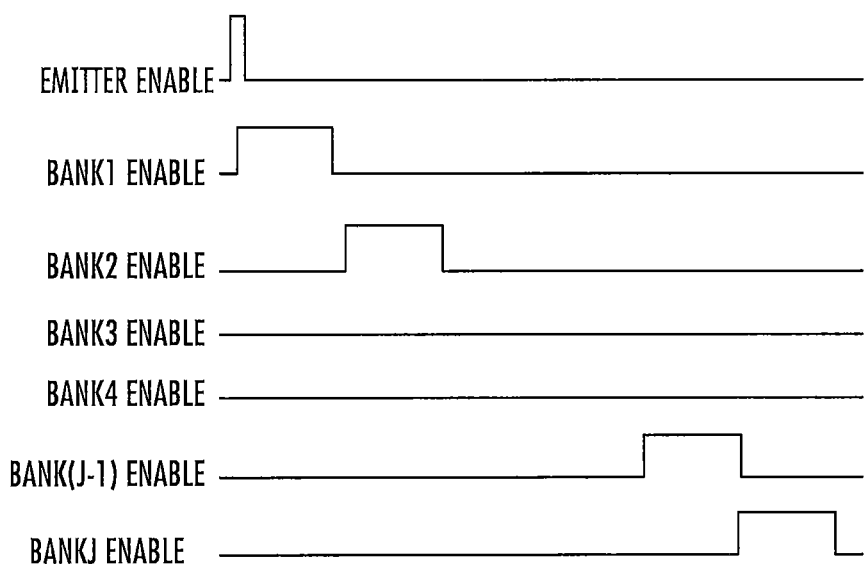
Figure 7A:
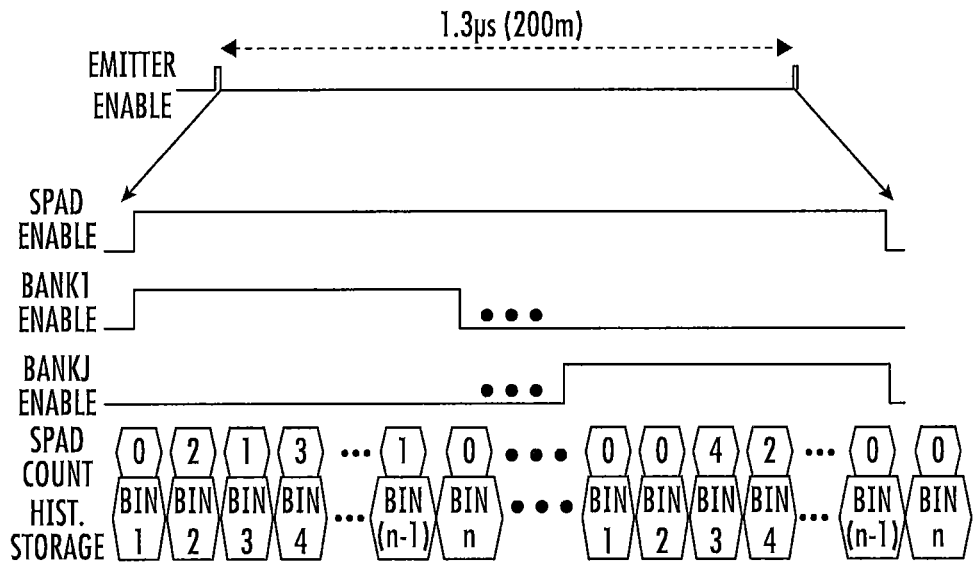
FIGS. 7A and 7B illustrate example timing diagrams showing the relationship between the SPAD enable signal and the PRMW operations for the detector pixel of FIG. 5.
Figure 7B:
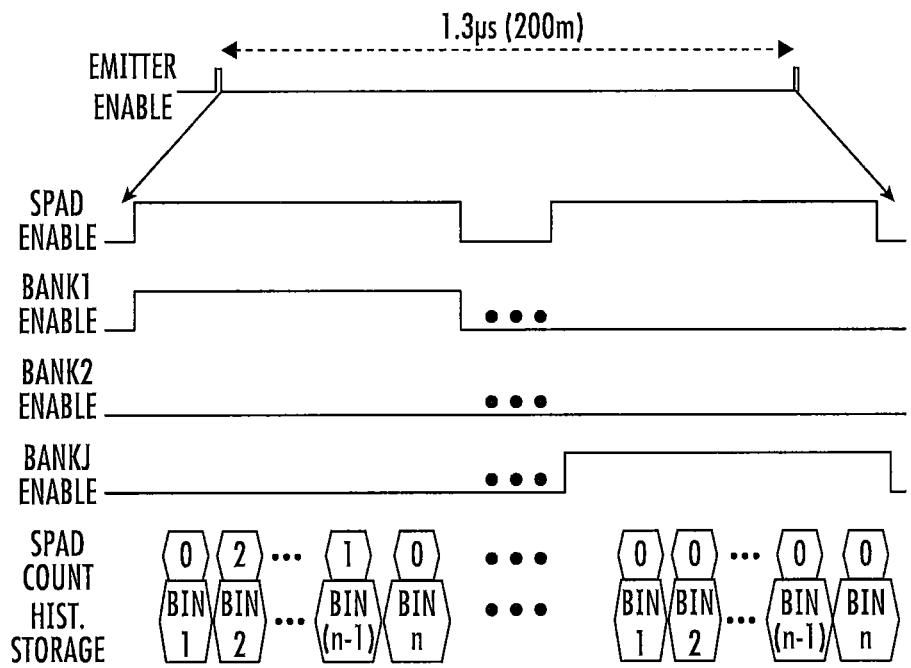

An example of a detector pixel 500 with multiple shared memory sub-arrays or banks 510 and a PRMW (Precharge, Read, Modify, Write) controller 520 according to some embodiments of the present disclosure is illustrated in FIG. 5. FIGS. 6A and 6B illustrate an example of a timing diagram for the detector pixel of FIG. 5. FIGS. 7A and 7B illustrate example timing diagrams showing the relationship between the SPAD enable signal and the PRMW operations for the detector pixel of FIG. 5.

As illustrated in FIG. 5, a detector pixel 500 according to embodiments herein may include one or a plurality of detectors (e.g., SPADs) and associated interfaces 505. The detector(s) may physically share a memory 507 on and/or associated with the detector pixel 500. In some embodiments, for example, the shared memory 507 may be a static random access memory (SRAM), but the embodiments described herein are not limited thereto. In some embodiments, for example, the shared memory 507 may be dynamic random access memory (DRAM) or other appropriate memory storage technology. In some embodiments, the shared memory 507 may be split into sub-blocks 510, e.g., to reduce bitline capacitance. For example, each of the sub-blocks 510 may be a separate memory device and/or may have separate output lines from which data can be read (illustrated as the arrows in FIG. 5). In a conventional device in which a single large memory is used to store all of the histogram data, the common bitlines used to access the data in the larger memory may have a higher capacitance and, thus, a slower switching and/or operation time. Thus, access to a plurality of smaller, separate memory devices may be faster than to a larger memory device commonly accessed by multiple pixels and/or detectors. In some embodiments, the use of separate memory blocks 510, each having separate output lines, may reduce this capacitance and allow for faster operation. In FIG. 5, the sub-blocks 510 are illustrated as being n bins×m bits SRAM, but this is merely an example and not intended to limit the inventive concepts. In some embodiments, the detector pixel 500 may include a control circuit (e.g., control circuit 105 and/or timing circuit 106 of FIG. 1) that may include a PRMW controller 520. The PRMW controller 520 may be used to access and/or update counts stored in the memory blocks 510. The PRMW controller 520 may be shared among the detectors of the detector pixel 500 and may be configured to multiplex access to the shared memory 507 between the detectors of the detector pixel 500. The PRMW controller 520 may be configured to control an access to the shared memory 507 by the detectors (e.g., the SPADs) of the detector pixel 500 according to a time duration that has elapsed since an emission of an emitter pulse.

Embodiments of the present invention provide detector operation schemes that can achieve significant power reduction. In some embodiments, the power reduction may be implemented by providing separate memory locations 510 inside each pixel 500, that is, such that each detector pixel 500 includes separately addressable memory locations 510. In some embodiments, the separately addressable memory locations 510 may be memory arrays within the shared memory 507. In some embodiments, the separately addressable memory locations 510 may be separate memory blocks, each having output lines from which data of the memory locations 510 may be accessed.

Figure 11A:
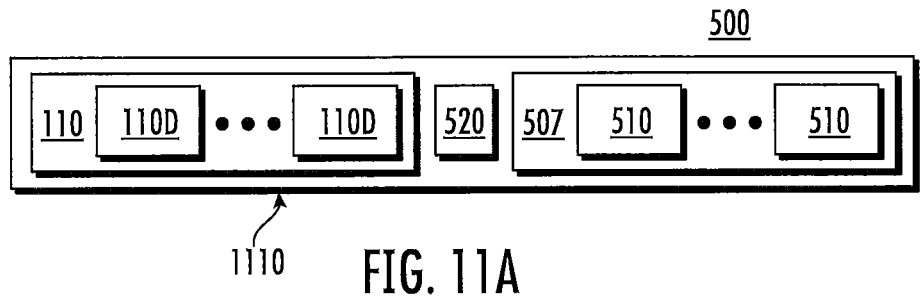
FIGS. 11A to 11C are schematic illustrations of examples of a pixel according to some embodiments of the present disclosure.
Figure 11B:
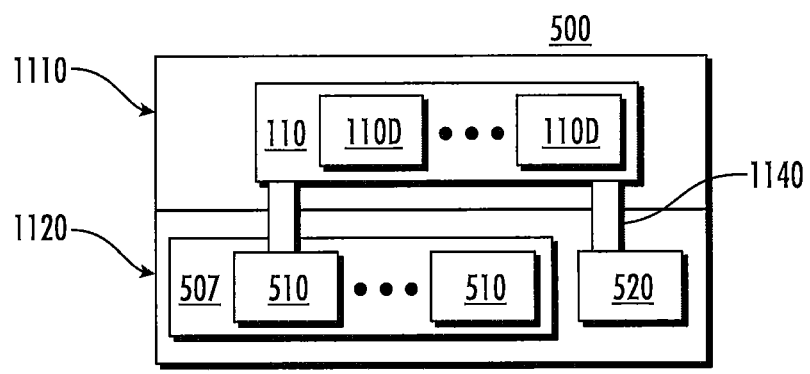
Figure 11C:
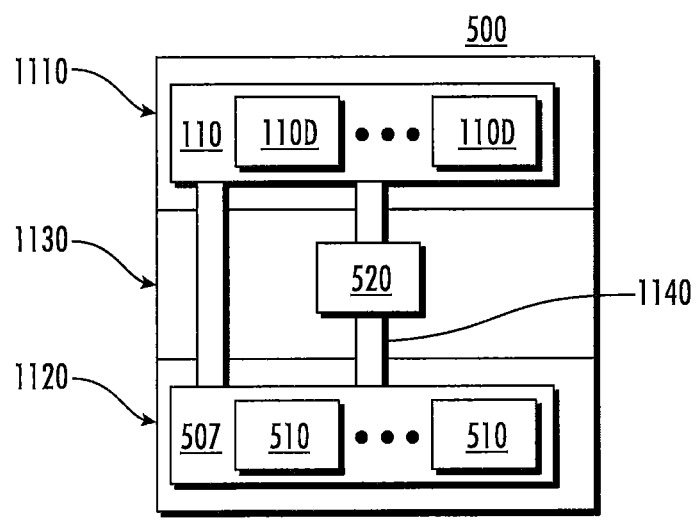

FIGS. 11A to 11C are schematic illustrations of examples of a pixel 500 according to some embodiments of the present disclosure. Referring to FIG. 11A, in some example embodiments of the pixel 500, the memory arrays 510 of the shared memory 507 may be implemented on a same substrate 1110 and/or semiconductor structure as the detector elements 110d (e.g., an array 110 of SPAD detectors 110D) along with the processing circuitry, including the PRMW controller 520, Referring to FIG. 11B, in some example embodiments of the pixel 500, a different, second substrate 1120 and/or semiconductor structure may be bonded to a first substrate 1110. The first substrate 1110 may include the array 110 of detector pixels 110D and the second substrate 1120 may include the shared memory 507 (including the sub-blocks and/or separately addressable memory locations 510) and processing circuitry, including the PRMW controller 520.

Referring to FIG. 11C, in some example embodiments of the pixel 500, a different, third substrate 1130 and/or semiconductor structure may be bonded to the first substrate 1110 and the second substrate 1120. The first substrate 1110 may include the array 110 of detector pixels 110D and the second substrate 1120 may include the shared memory 507 (including the sub-blocks and/or separately addressable memory locations 510). The third substrate may include processing circuitry, including the PRMW controller 520. In FIG. 11C, the stacking order of the first substrate 1110, the second substrate 1120, and the third substrate 1130 is merely and example and not intended to limit the inventive concepts.

The embodiments of the inventive concepts are not limited to the examples shown in FIGS. 11A to 11C, and other arrangements of the components of the pixel 500 are possible without deviating from the inventive concepts. For example, alternative or additional methods and configurations for arranging components on one or more substrates are described in U.S. Pat. No. 9,153,609 to Blanquart. In pixels 500 incorporating multiple substrates and/or semiconductor structures, the substrates and/or semiconductor structures may be interconnected via in-pixel bonding, through-silicon vias (TSVs) 1140, through an interposer, and/or through a metal connection as is known in the art.

Referring back to FIGS. 6A to 7B, the emitter pulse may be controlled responsive to a control signal, such as an emitter enable signal, which may be provided by a control circuit (e.g., control circuit 105 and/or driver circuit 116 of FIG. 1). As illustrated in FIGS. 6A, 6B, 7A, and 7B, the emitter enable signal may be active at the beginning of an acquisition operation of the lidar system. The emitter enable signal may instruct or control the laser or other emitter element to fire or emit a pulse (e.g., a laser pulse). At that time, or shortly thereafter (in order to avoid triggering the SPADs from nearby reflections), or shortly before (in order to ensure that the SPADs are fully charged up by the time the laser fires so as not to miss nearby targets), one or more detectors of the SPAD array are activated or "charged" to detect arriving photons by undergoing an avalanche. This is illustrated, for example, by the SPAD Enable signal in FIGS. 7A and 7B.

In embodiments described herein, a detector time gate or strobe window may refer to the respective durations of activation and deactivation of one or more detectors (e.g., responsive to respective strobe signals from a control circuit) over the temporal period or time between pulses of the emitter(s) (which may likewise be responsive to respective emitter control signals from a control circuit).

In some embodiments, the strobe window is defined by the activation time of the detectors (e.g., the SPADs) and a signal processing circuit receives the output of the detectors. The time between pulses (which defines a laser cycle, or more generally emitter pulse frequency) may be selected or may otherwise correspond to a desired imaging distance range for the lidar system. For example, FIGS. 7A and 7B illustrate a time between activation of the emitter of 1.3 μs, which corresponds to an approximate emitter frequency of 750 kHz, and may be used to effectively illuminate targets at 200 m. The operating frequencies and laser cycle durations of FIGS. 7A and 7B are merely examples and other values could be used. For example, frequencies of 375 kHz or 1.5 MHz may be used having laser cycles of about 1.3 μs and 0.6 μs, respectively, to name just two additional examples. Similarly, other operating ranges shorter or farther than 200 m may be utilized, such as operating ranges of 50 m, 100 m, 150 m, and 400 m, to name just a few.

In embodiments described herein, the strobe windows or detector control signals may be configured to activate the one or more detectors (e.g., SPADs) of the detector array so as to remain active for the duration of an image acquisition frame (and not just for the duration of a subframe), except for when the detector is discharged by an avalanche and is within its dead time. In some embodiments, the dead time may range from 1 to 25 ns. For example, though the SPAD Enable signal is indicated as being active during the entire duration between emitter pulses, it will be understood that, in some embodiments, the SPAD Enable signal may be dropped in response to an avalanche event for the SPAD.

The output of the detector and/or detector pixel (in some embodiments, the counting of avalanche events per time bin) may be directed to different memory banks corresponding to different distance sub-ranges (e.g., Banks 1 to J). For example, as illustrated in FIGS. 6A, 6B, 7A, and 7B, different ones of the shared memory may be activated at different times with respect to the emission of the emitter pulse. Referring to FIG. 6A, as time passes after the emission of the emitter pulse, different memory locations (e.g., different memory banks) may be activated such that photons that are detected at different delays relative to the emitter pulse are respectively stored in different memory locations. The SPAD may remain enabled while the underlying memory storage location is changed. For example, as illustrated in FIG. 6A, during a first time duration after the emitter pulse (as indicated by the Emitter Enable signal), a first bank (e.g., Bank 1) may be enabled. Counts of photons detected during this time period by the detector will be stored in Bank 1. At a later duration, Bank 1 may be deactivated and Bank 2 may be activated. Counts of photons detected during this time period by the detector will be stored in Bank 2. The durations over which a particular memory location is activated may correspond to a time range that may be correlated to a particular distance sub-range of the imaging distance range. This process may be repeated a sufficient number of times as required to collect a sufficiently high quality estimate of a target's range—for example, if the range uncertainty per measurement follows a Gaussian distribution with a standard deviation s, then P repeated measurements will result in a range standard deviation of s/sqrt(P). In other related lidar systems, a SPAD may be enabled during a particular distance subrange of a frame, but may remain disabled during other subranges of the frame. Another frame may be used in such lidar systems to detect photons in different distance subranges. In contrast, embodiments according to the present disclosure may keep the SPAD enabled over multiple distance subranges of a frame, and the underlying location at which detected photon counts are stored may be changed by activating different ones of the separate memory locations.

FIG. 6A is intended as an example, and is not intended to be limiting of the embodiments described herein. For example, in some embodiments, the banks may not be activated consecutively while the detector/SPAD is activated. For example, as illustrated in FIG. 6B, in some embodiments, a first set of banks (e.g., Banks 1 and 2) may be activated for a first period after the emitter enable signal, while a second set of banks (e.g., Banks (J−1) and J) may be activated for a second period, at a later duration after the emitter enable signal. In some embodiments, banks associated with the time period between the activation of the first set of banks and the activation of the second set of banks may not be activated (e.g., Banks 3 and 4). That is to say that not all of the memory banks may be utilized during a particular laser cycle.

As in FIG. 6A, FIG. 7A also illustrates that the different memory banks may be activated (as illustrated by the Bank Enable signals) at different times during the emitter pulse cycle based on a delay or duration of time that has elapsed since the emitter pulse was activated (as illustrated by the Emitter Enable signal). The SPAD Enable signal may be active such that one or more detectors (e.g., a SPAD) may continue to detect and count incident photons throughout the emitter pulse cycle. When the one or more detectors includes a SPAD, for example, incident photons may cause avalanche events with the SPAD. As illustrated in FIG. 7A, the avalanche events from the detector(s) (labeled as SPAD Count) may be sampled (e.g., periodically) and saved in different bins (e.g., bin #1 to bin #n). The bins may be physically separate areas of the detector pixel memory and, in some embodiments, may be stored in physically separate memory arrays (e.g., within Bank 1-Bank J). In other words, each of the separate banks of memory may be configured to store bins (e.g., Bin 1-Bin n) within the bank of memory, such that, if the system has J banks of memory, there are J×n bins for storing the counts from the detector(s). The duration covered by any particular bin may, in some embodiments, be equal to the emitter cycle time (e.g., 0.6 µs, 1.3 µs, 2.6 µs, etc.) divided by (J*n).

By leaving one or more detectors of the detector pixel active during the entire laser pulse cycle, signals from the full emitter pulse may be captured and utilized, while the use of rotating storage bins may still allow for respective distances to be calculated based on the arrival of the incident photons. In some embodiments, the detector(s) may be active for the full emitter pulse cycle (e.g., the time between a first emitter pulse and a second, subsequent, emitter pulse). In some embodiments, the detector(s) may be active more than 75% of the emitter pulse cycle. In some embodiments, the detector(s) may be active more than 50% of the emitter pulse cycle.

As with FIG. 6B, FIG. 7B illustrates an embodiment in which the memory banks are not necessarily enabled consecutively. For example, a first set of one or more banks (illustrated as, for example, Bank 1) may be enabled during a first period after the emitter (e.g., a SPAD) is enabled. The detector(s) (e.g., SPAD(s)) may be disabled for another portion of the emitter cycle and banks that are associated with this time duration (illustrated as, for example, Bank 2) may remain deactivated. The detectors(s) may be re-enabled during a later portion of the laser cycle and memory banks associated with that time period (e.g., Bank J) may be activated to store the results of the activation of the detector (s).

Referring back to FIG. 3, the operation of the present invention may be contrasted with embodiments in which distinct strobe activation windows per emitter/laser cycle are used. Receiver jitter may be on the order of 10-5000 picoseconds (ps). A detector (e.g., a SPAD) of the pixel may be activated for a single strobe window (e.g., approximately 133 ns) within a laser cycle (e.g., 1.3 µs). Each strobe window may be divided into temporal histogram bins. Hundreds or thousands of laser cycles may be repeated per subframe to generate a measurement of sufficient quality for a given strobed range. Subframes may be collected (e.g., responsive to strobe window read outs) sequentially to form or define a single frame covering the whole range. Unlike the embodiment described with respect to FIGS. 5-7B, the embodiment of FIG. 3 may not maintain the activation of the detector for large portions of the emitter cycle and may sample photons over what is a primarily specific distance sub-range, with other portions of the emitter cycle remaining un-sampled.

Figure 8:
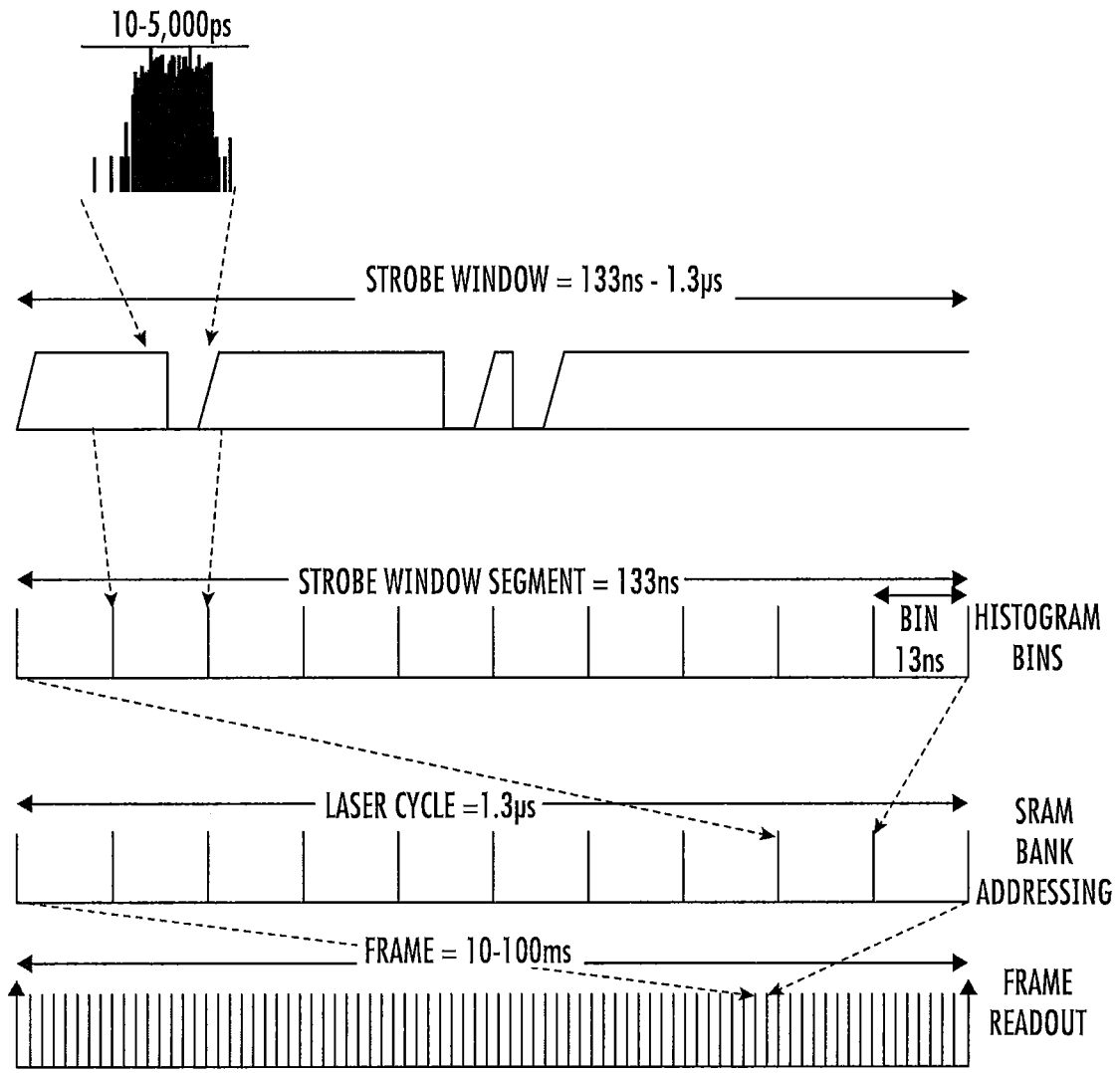
FIG. 8 is a timing diagram illustrating operations according to some embodiments described herein.

FIG. 8 illustrates a timing diagram for operations according to some embodiments described herein. As illustrated in FIG. 8, a detector (e.g., a SPAD) of a detector pixel may be activated over half or more of an, or an entire, emitter cycle, with the exception, in some embodiments, of dead times after an avalanche event. After respective avalanche events, counts associated with the detected photons of the detector may be stored in histogram bins. The bins themselves may additionally be stored in a shared memory (e.g., SRAM) at locations in the shared memory that are rotated and/or multiplexed based on a time since the beginning of the emitter cycle. At the end of a plurality of emitter cycles, the frame may be readout to determine locations of targets (e.g., to develop a point cloud).

As illustrated in FIG. 8, the storage locations (shown as SRAM Bank Addressing) may be swapped and/or iterated (e.g., through the use of multiplexer and/or other type of memory pointer) to change the location at which the avalanche counts are stored based on a time delay and/or duration since the emission of the emitter pulse. In some embodiments, the storage location may be swapped at different portions of the timeframe of the strobe window, such that different segments of the strobe window are saved in different storage locations in the physical memory (e.g., in different banks of an SRAM). FIG. 8 illustrates an example in which the strobe window is broken into segments that are 133 ns in duration, but the present inventive concepts are not limited thereto. As an example embodiment, the lidar system may utilize a 1.3 µs strobe window for a 1.3 µs is emitter cycle, with the strobe window broken into ten strobe window segments of 133 ns each that are stored in separate physical banks of SRAM memory. The operating frequency and laser cycle duration of FIG. 8 is merely an example and other values could be used. For example, frequencies of 375 kHz or 1.5 MHz may be used having laser cycles of about 1.3 µs and 0.6 µs, respectively, to name just two additional examples. Similarly, different numbers of bins could be used other than those illustrated in FIG. 8. For example, in some embodiments, eight, fifteen, or twenty bins may be used, which would result in an adjusted bin width (in time). In contrast to the embodiment illustrated in FIG. 3, in which an detector was only active during a particular duration based on a time since the emission of the emitter pulse, and inactive at other times, some embodiments described herein may allow for the detector to continue to detect incoming photons up to an entirety of each emitter cycle with the address management scheme for the shared memory used to categorize the detected photons based, in part, on their time of arrival.

FIG. 8 also illustrates that multiple levels of storage may take place. For example, the detector may maintain a plurality of histogram bins (e.g., n bins×J banks of memory) associated with a particular detection sub-range and/or duration (illustrated as 13 ns bins of a 133 ns strobe window segment in FIG. 8). Within that detection sub-range and/or duration, the detector may categorize counts of arriving photons based on a time offset of the arriving photons with respect to the beginning of the duration. This categorization may be a histogram over a series of bins. FIG. 8 illustrates ten bins, but the embodiments described herein are not limited thereto. The bins may be used to perform a statistical analysis of counts to determine a statistical peak for the detection of photons within the bins (e.g., as offset from a beginning of the detection duration and/or the emitter cycle). These bins may be stored together in the shared memory based on a time since the beginning of the emitter pulse. Thus, a plurality of groups of bins (e.g., histograms) may be stored in the shared memory over the laser cycle. In some embodiments, the number of strobe window segments (e.g., k strobe window segments) may be equal to the number of physical banks available for storage (e.g., J banks), though the present inventive concepts are not limited thereto. In some embodiments, the number of bins in a memory bank (e.g., n bins) may be equal to the number of bins within the strobe window segment, such that there is a one-to-one correspondence, though the present inventive concepts are not limited thereto.

In embodiments of the present invention, the subframe readout per distance sub-range may be eliminated because all strobe windows corresponding to a distance sub-range are captured within the same laser cycle. The time between consecutive laser cycles may be divided into strobe windows, with the detector active during each of the strobe windows. Thus, in some embodiments, the detector may be active between 50% and 100% of the emitter pulse cycle. Avalanches and/or photon counts generated in a given strobe window are digitized and stored in the memory bank that is correlated to or otherwise appropriate for the given strobe window (e.g., based on a time since the beginning of the emitter/laser cycle).

In some embodiments, the strobe window durations are identical for all distance ranges. In some embodiments, the durations of the strobe windows are not identical. In some embodiments, closer targets may be recognized to have a higher probability to generate an avalanche in the receiver as compared with more distant targets. Therefore, fewer laser pulses may be used in order to collect the same number of range measurements. Thus closer-range strobes (e.g., strobe windows for time durations from the emitter pulse that are associated with relatively closer or less distant targets) may be shorter in duration and longer-range strobes (e.g., strobe windows for time durations associated with relatively farther or more distant targets) will be longer in duration, in some embodiments with a fixed peak laser power for multiple, or across all, strobe windows.

In the above example, for a fixed frame duration and laser cycle time and without changing the peak laser power, embodiments of the present invention can provide more laser cycles per frame. For example, in some timing schemes, with a 1.3 μs laser cycle and 133 ns strobe window, 1000 pulses may be emitted per strobe window, which is also 1000 pulses for targets in the distance subrange corresponding to the strobe window, per frame. In contrast, in embodiments of the present invention described herein, if a frame's duration is 30 ms, then each strobe window "receives" (or can be detected) 30 ms/1.3 μs=23,076 pulses.

In some embodiments, the peak laser power is maintained but the duty cycle of the laser emission per frame is reduced. In other words, if 1,000 pulses were required, the system still emits 1,000 pulses, but instead of doing so for a 133 ns strobe window (in the example above), it distributes those pulse across the 30 ms frame, thus reducing the average power consumption of the system while maintaining the signal-to-noise ratio.

For example, noise in the form of photons originating from solar and/or other ambient background in the lidar environment rather than the emitter may arrive uncorrelated, whereas photons from a target illuminated by a pulsed light source (e.g., a pulsed laser) such as the emitter of the lidar system have a higher likelihood of being detected in groups of two or more in a narrow time correlation window (for example, a time window corresponding to the pulse width). After detection of photon arrival, a control circuit may indicate detection of correlated photon pairs having respective times of arrival that fall within the predetermined correlation time relative to one another. In some embodiments, a time to digital converter (TDC) may be used to determine the time of arrival. Some embodiments described herein, in which a detector is collecting signals across an entire pulse cycle, may improve the ability to distinguish echo signal returns (e.g., photons from the emitter) from non-correlated photons. This may result in a reduced and/or minimum average power configuration while maintaining and/or improving the signal-to-noise ratio.

In some embodiments, the peak laser power may be reduced and the number of laser pulses per frame may be increased, for example to fill the whole frame. In the example above, 23,076 pulses may be fired/emitted. Since more laser pulses are fired, this means that, in Time-Correlated-Single-Photon-Counting applications, the correlated signal can be detected more efficiently than when fewer laser pulses are used. While the ratio of peak power reduction may not scale linearly with the number of photons, mainly due to ambient photons, configurations according to some embodiments described herein may enable a significant reduction in peak power.

In some embodiments, subframes may be defined for each strobe window, and emitter power may be scaled (for example as $1/R^2$), where R is the target range for the lidar system. However, in some embodiments according to the present invention, signals from all strobe ranges may be collected for each laser cycle. Accordingly, embodiments described herein may combine these two approaches to provide multiple benefits.

For example, in some embodiments, an emitter may be utilized at peak power and all strobe windows may be sampled (e.g., the detector may be activated during) for all times during the emitter cycle (e.g., the time between laser pulses). In situations in which highly reflective targets are close to the emitter, there may be difficulties in correctly determining the distances of the highly reflective target.

In some embodiments, an emitter may be utilized at peak power and the detector may be deactivated during some strobe windows that correspond to closer distances (e.g., durations immediately after the emitter pulse) but active for strobe windows that correspond to farther distances. In some embodiments, the detector may still be activated for greater than 50% of the emitter cycle. This may keep the lidar system from sampling those distances at which a target would be likely to be excessively reflective.

Figure 9:
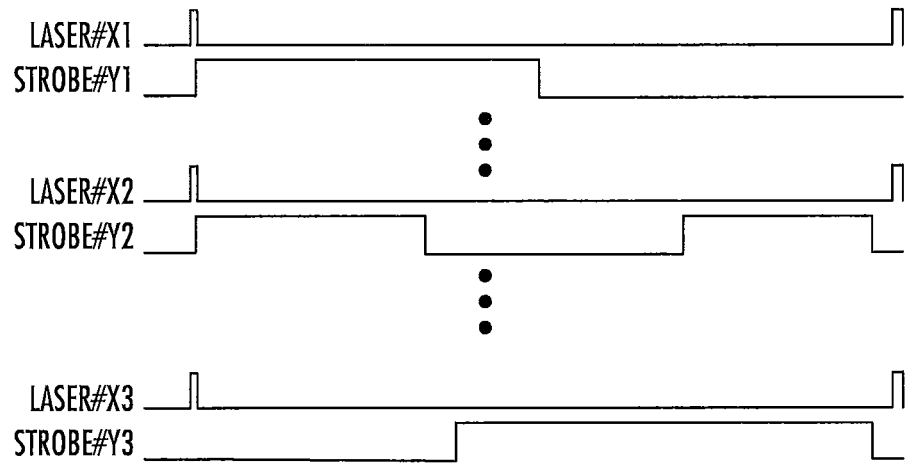
FIG. 9 is a timing diagram illustrating configurations of strobe windows according to some embodiments of the present disclosure.

For example, FIG. 9 illustrates different configurations of strobe windows according to some embodiments of the present disclosure. As illustrated in FIG. 9, the inventive concepts allow for strobe windows to be "shaped" such that a strobe window is active for differing durations, including durations in which active periods of the strobe window are not consecutive within a given emitter cycle. During periods in which the strobe window is active, data related to incident photons of the detector may be saved to different physical memory locations based on an elapsed time duration from an emission pulse according to embodiments described herein. During periods in which the strobe window is inactive, data may not be saved in the physical memory locations associated with those distance sub-ranges. Thus, storage of data into the physical memory may "skip" portions of the physical memory based on an activation state of the strobe window.

For example, for some subframes of a lidar system, the strobe window may be active for a first portion of the emitter cycle but inactive for a latter part of the emitter cycle. In some embodiments, the strobe window may be active for a first portion of the emitter cycle that is associated with closer distance sub-ranges but inactive for a second portion of the emitter cycle that is associated with farther distance sub-ranges, as illustrated in FIG. 9 with "Laser #X1 and "Strobe #Y1" as an example. In some embodiments, the strobe window may be inactive for a first portion of the emitter cycle that is associated with closer distance sub-ranges but active for a second portion of the emitter cycle that is associated with farther distance sub-ranges, as illustrated in FIG. 9 with "Laser #X3" and "Strobe #Y3" as an example. In some embodiments, the strobe window may be active for a first portion of the emitter cycle that is associated with closer distance sub-ranges, inactive for a second portion of the emitter cycle that is associated with middle distance sub-ranges, and active for a third portion of the emitter cycle that is associated with farther distance sub-ranges, as illustrated in FIG. 9 with "Laser #X2" and "Strobe #Y2" as an example. In the examples of FIG. 9, a duration of the strobe window is longer than half of the duration between the emitter pulses (e.g., the pulse cycle duration). It will be understood that a lidar system according to embodiments described herein may utilize one or all of these configurations of strobe windows during a particular acquisition period (e.g., for a particular frame). It will also be understood that the strobe windows of FIG. 9 are merely examples, and that different configurations of strobe windows may be utilized without deviating from the present invention.

In some embodiments, a plurality of detectors may be connected to the same processing circuit, whereby zero, one or more of the detectors may be enabled at a particular time of the laser cycle by varying activation of the associated strobe window in response to the received signal and/or a determined intensity of background light (e.g., ambient and/or other optical energy that is uncorrelated to an emitter). By selectively activating (or deactivating) the detector (e.g., during periods of high determined background intensity or other event that might saturate the signal processing), the detectors may generate a sufficient signal to be processed correctly yet not saturate the processing circuit (e.g., saturate the histogram).

In some embodiments, the power of the emitter may be reduced or "stepped down" and the detector may be activated during some strobe windows that correspond to closer distances (e.g., durations immediately after the emitter pulse) but deactivated for strobe windows that correspond to farther distances. In some embodiments, the detector may still be activated for greater than 50% of the emitter cycle. This may allow for the detection of closer targets, including highly reflective targets, using the lower power emitter pulse. Since the lower power emitter pulse may be less effective at illuminating a distant target, computation time (and resources) can be reduced for these more distant ranges. However, the present inventive concepts are not limited thereto. In some embodiments, the detectors may remain active for the farther ranges, even at lower levels of emitter power, since photons may still be received.

In some embodiments, respective ones of the previously-described techniques may be combined. For example, in some emitter cycles of the frame, a maximum power for the emitter may be utilized and the detector may be deactivated during certain strobe windows while, in other emitter cycles, the detector may be activated during all strobe windows at the maximum emitter power. In some emitter cycles of the frame, the power for the emitter may be reduced and the detector may be deactivated during certain strobe windows while in other emitter cycles the detector may be activated during all strobe windows at the reduced emitter power. The collection data from all of the emitter cycles may be combined to determine accurate distances to the various targets in the field of view of the lidar system, and, for example, a point cloud may be constructed responsive thereto.

Figure 10:
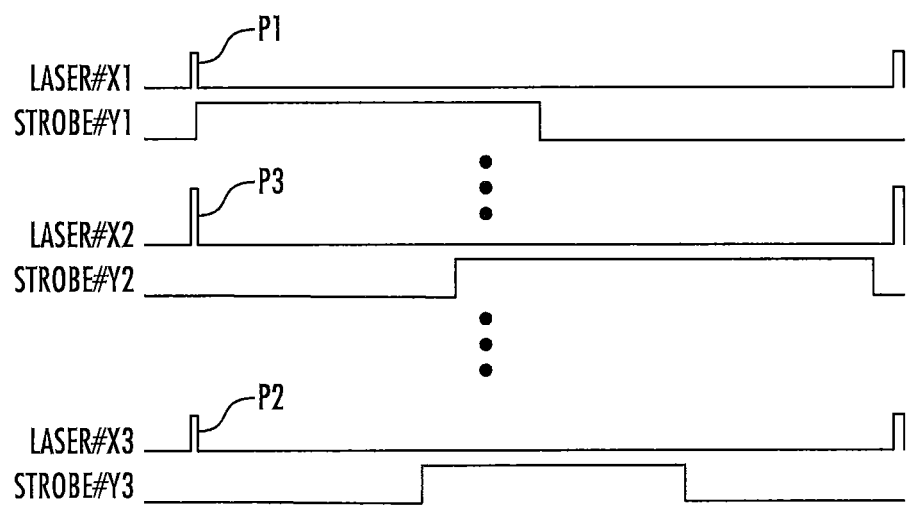
FIG. 10 is a timing diagram illustrating configurations of strobe windows and power levels of an emitter according to some embodiments of the present disclosure.

Other combinations of the embodiments are possible, as will be appreciated by one of ordinary skill in the art, and the examples provided herein are not intended to limit the present inventive concepts. FIG. 10 illustrates different configurations of strobe windows and power levels of an emitter according to some embodiments of the present disclosure. In FIG. 10, a relative power of the emitter (illustrated as "LASER #Xy" in FIG. 10, where y=1, 2, 3) is shown, for illustration purposes only, as a height of the emitter pulse. For example, in some emitter cycles of the frame, a reduced power P1 for the emitter may be utilized and the detector may be deactivated during strobe windows associated with farther distance sub-ranges and activated during strobe windows associated with closer distance sub-ranges, as illustrated in FIG. 10 with "Laser #X1" and "Strobe #Y1" as an example. For example, in some emitter cycles of the frame, a maximum and/or high power P3 for the emitter may be utilized and the detector may be deactivated during strobe windows associated with closer distance sub-ranges and activated during strobe windows associated with farther distance sub-ranges, as illustrated in FIG. 10 with "Laser #X2" and "Strobe #Y2" as an example. For example, in some emitter cycles of the frame, a mid-level power P2 for the emitter may be utilized and the detector may be deactivated during strobe windows associated with short and far distance sub-ranges and activated during strobe windows associated with medium-range distance sub-ranges, as illustrated in FIG. 10 with "Laser #X3" and "Strobe #Y3" as an example.

Embodiments described herein may significantly reduce the probability of pile-up, which may result from a detection probability of photon arrival that is too high. Detector and electronics may have a "dead" time for at least some nanoseconds after a photon event (e.g., a SPAD avalanche). The dead time may range from 1 to 25 ns. During this time they may not be capable of processing additional events (e.g., sampling a photon incident thereon). Because of these dead times, detectors may register a first photon but may fail to detect the following ones. This may lead to an over-representation of early photons in the histogram, an effect called "pile-up." In architectures, such as those described herein, which interpolate the position of the histogram peak from grossly sampled bins, if the detection probability is too high, the normal temporal distribution may be lost and instead all returns may fall in a single bin. This may make interpolation difficult and/or impossible. By reducing the power for closer ranges (e.g., for strobe windows corresponding to closer distances), this problem may be reduced and/or minimized.

In addition, embodiments described herein may significantly reduce stray light effects. Stray light, for example from retroreflectors, may be exacerbated as illumination power is increased. By reducing illumination power for shorter range targets, the problem may be reduced.

In some embodiments, the emitter power may be scaled piecewise for each strobe window (e.g., as $(R/R_{max})^2$ with R being some range within the strobe window. In some embodiments, the power may be scaled continuously approximating the function above.

In some embodiments, use of emitter signals provided at different power levels may be used to improve the range determination of the target and/or to adjust for levels of background intensity in the received signals. For example, the emitter may emit a first optical signal at a first power level and a second optical signal at a second power level, different from the first power level. The detectors may provide a first output signal responsive to the first optical signal (e.g., based on a reflection of the first optical signal from the target) and a second output signal responsive to the second optical signal (e.g., based on a reflection of the first optical signal from the target). A processing circuit may analyze the first and second output signals to generate range data for the target. The processing circuit may generate the range data based on the first output signal, the second output signal, or a combination of the two output signals. Though only two optical signals/output signals are discussed as part of the analysis of the improved range data, this is only an example. In some embodiments, more than two optical signals at varying power levels may be emitted and/or more than two output signals may be generated by the detectors. By analyzing the range data from optical emissions at different power levels, the lidar system can adjust for varying levels of background intensity that can be caused by, for example, retroreflectors or other anomalies in the field of view.

It will be understood that emitters and/or detectors that are configured to operate according to the examples described herein operate based on respective control signals (such as emitter control signals and detector strobe signals) generated by one or more associated control circuits, such as a sequencer circuit that may coordinate operation of the emitter array and detector array. That is, the respective control signals may be configured to control temporal and/or spatial operation of individual emitter elements of the emitter array and/or individual detector elements of the detector array to provide functionality as described herein.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be VCSELs. In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concepts to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment," "one embodiment," and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts.

The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

The invention claimed is:

1. A Light Detection and Ranging (lidar) system, comprising:
   an emitter configured to emit a plurality of optical signals;
   a detector configured to be activated to detect one of the optical signals in light that is incident on the detector and to provide count data corresponding to the one of the optical signals that were detected;
   a plurality of storage memory blocks configured to store the count data therein; and
   a control circuit configured to change a storage memory block at which the count data is stored from a first storage memory block having a first bitlines to a second storage memory block having a second bitlines based on an elapsed time duration from an emission of the one of the optical signals.

2. The lidar system of claim 1, wherein the control circuit is further configured to perform a precharge, read, modify, write (PRMW) operation to store the count data in the second storage memory block.

3. The lidar system of claim 1, wherein the plurality of optical signals comprise a first optical signal and a second optical signal, subsequent to the first optical signal, with a pulse cycle duration therebetween, and
   wherein the control circuit is further configured to activate the detector for a duration that is longer than half of the pulse cycle duration between the first optical signal and the second optical signal.

4. The lidar system of claim 1, wherein the plurality of optical signals comprise a first optical signal and a second optical signal, subsequent to the first optical signal, with a pulse cycle duration therebetween, and
   wherein the control circuit is further configured to selectively operate the emitter at a first power level or a second power level, less than the first power level.

5. The lidar system of claim 4, wherein the control circuit is further configured to operate the emitter at the first power level, and
   wherein the control circuit is further configured to deactivate the detector during a first portion of the pulse cycle duration and to activate the detector during a second portion of the pulse cycle duration, after the first portion.

6. The lidar system of claim 4, wherein the control circuit is further configured to operate the emitter at the second power level, and
   wherein the control circuit is further configured to activate the detector during a first portion of the pulse cycle duration and to deactivate the detector during a second portion of the pulse cycle duration, after the first portion.

7. The lidar system of claim 1, further comprising a signal processing circuit,
   wherein the detector comprises a plurality of detectors, each coupled to the signal processing circuit, and
   wherein the control circuit is further configured to activate one or more of the plurality of detectors responsive to the one of the optical signals so as to avoid a saturation of the signal processing circuit.

8. The lidar system of claim 7, wherein the control circuit is further configured to detect an intensity of background light in the light that is incident on at least one of the plurality of detectors and control the activation of the one or more of the plurality of detectors responsive thereto.

9. The lidar system of claim 1, wherein the first storage memory block comprises a first plurality of histogram bins, each configured to store a first plurality of bits associated with the count data, and
   wherein the second storage memory block comprises a second plurality of second histogram bins, each configured to store a second plurality of bits associated with the count data.

10. A control circuit of a Light Detection and Ranging (lidar) system, the control circuit configured to perform operations comprising:
    controlling an emitter to emit a first optical signal and a second optical signal subsequent to the first optical signal, with a pulse cycle duration therebetween;

activating a detector to detect one of the first and/or second optical signals in light that is incident on the detector and to provide count data corresponding to the one of the first and/or second optical signals that were detected, wherein the detector is activated for a time duration that is longer than half of the pulse cycle duration between the first optical signal and the second optical signal; and controlling access to shared memory blocks to change a storage memory block at which the count data is stored from a first storage memory block having a first bitlines to a second storage memory block having a second bitlines based on an elapsed time duration from an emission of the first optical signal.

11. The lidar system of claim 10, wherein the first storage memory block comprises a first plurality of histogram bins, each configured to store a first plurality of bits associated with the count data, and wherein the second storage memory block comprises a second plurality of second histogram bins, each configured to store a second plurality of bits associated with the count data.

12. The control circuit of claim 10, wherein the control circuit is further configured to activate the detector for a duration that is longer than half of the pulse cycle duration between the first optical signal and the second optical signal.

13. The control circuit of claim 10, wherein the control circuit is further configured to operate the emitter at a first power level to emit the first optical signal and to operate the emitter at a second power level, different from the first power level, to emit the second optical signal.

14. The control circuit of claim 10, wherein the detector is configured to generate a first output signal in response to the first optical signal and a second output signal in response to the second optical signal, and wherein the control circuit is further configured to generate range data of a target object based on the first output signal, the second output signal, or a combination of the first output signal and the second output signal.

15. A method of operating a control circuit of a Light Detection and Ranging (lidar) system, the method comprising:

controlling an emitter to emit a first optical signal and a second optical signal subsequent to the first optical signal;

activating a detector to detect one of the first and/or second optical signals in light that is incident on the detector and to provide count data corresponding to the one of the first and/or second optical signals that were detected, wherein the detector is activated for a time duration that is longer than half of a pulse cycle duration between the first optical signal and the second optical signal; and controlling access to shared memory blocks to change a storage memory block at which the count data is stored from a first storage memory block having a first bitlines to a second storage memory block having a second bitlines based on an elapsed time duration from an emission of the first optical signal.

16. The method of claim 15, wherein the detector comprises a plurality of detectors, wherein the first storage memory block and the second storage memory block are shared between the plurality of detectors, and wherein the method further comprises performing a precharge, read, modify, write (PRMW) operation to store the count data in the second storage memory block.

17. The method of claim 15, wherein the control circuit is further configured to activate the detector for a duration that is longer than half of the pulse cycle duration between the first optical signal and the second optical signal.

18. The method of claim 15, further comprising deactivating the detector during a first portion of the pulse cycle duration and to activate the detector during a second portion of the pulse cycle duration, after the first portion.

19. The method of claim 15, further comprising activating the detector during a first portion of the pulse cycle duration and to deactivate the detector during a second portion of the pulse cycle duration, after the first portion.

20. The method of claim 15, further comprising operating the emitter at a first power level to emit the first optical signal and to operate the emitter at a second power level, different from the first power level, to emit the second optical signal.

* * * * *